(12) United States Patent
Bylicki et al.

(10) Patent No.: US 12,182,583 B2
(45) Date of Patent: Dec. 31, 2024

(54) PERSONALIZED AVATAR EXPERIENCE DURING A SYSTEM BOOT PROCESS

(71) Applicant: Snap Inc., Santa Monica, CA (US)

(72) Inventors: Andrzej Bylicki, Vienna (AT); Ola Jeppsson, Vienna (AT); Bernhard Jung, Perchtoldsdorf (AT); Aidan Rogers, Seattle, WA (US); Olivier Slabbert Schonken, Vienna (AT); Farid Zare Seisan, San Diego, CA (US)

(73) Assignee: SNAP INC., Santa Monica, CA (US)

( * ) Notice: Subject to any disclaimer, the term of this patent is extended or adjusted under 35 U.S.C. 154(b) by 0 days.

(21) Appl. No.: 17/664,107

(22) Filed: May 19, 2022

(65) Prior Publication Data

US 2022/0374245 A1 Nov. 24, 2022

Related U.S. Application Data

(60) Provisional application No. 63/190,413, filed on May 19, 2021.

(51) Int. Cl.
*G06F 9/4401* (2018.01)
(52) U.S. Cl.
CPC .................. *G06F 9/4408* (2013.01)
(58) Field of Classification Search
CPC ....... G06F 9/4408; G06F 3/147; G06F 3/0484
See application file for complete search history.

(56) References Cited

U.S. PATENT DOCUMENTS

| | | |
|---|---|---|
| 5,880,731 A | 3/1999 | Liles et al. |
| 6,023,270 A | 2/2000 | Brush, II et al. |
| 6,223,165 B1 | 4/2001 | Lauffer |
| 6,772,195 B1 | 8/2004 | Hatlelid et al. |
| 6,842,779 B1 | 1/2005 | Nishizawa |
| 7,342,587 B2 | 3/2008 | Danzig et al. |
| 7,468,729 B1 | 12/2008 | Levinson |
| 7,636,755 B2 | 12/2009 | Blattner et al. |
| 7,639,251 B2 | 12/2009 | Gu et al. |
| 7,775,885 B2 | 8/2010 | Van Luchene et al. |
| 7,859,551 B2 | 12/2010 | Bulman et al. |
| 7,885,931 B2 | 2/2011 | Seo et al. |
| 7,925,703 B2 | 4/2011 | Dinan et al. |
| 8,088,044 B2 | 1/2012 | Tchao et al. |
| 8,095,878 B2 | 1/2012 | Bates et al. |
| 8,108,774 B2 | 1/2012 | Finn et al. |
| 8,117,281 B2 | 2/2012 | Robinson et al. |
| 8,130,219 B2 | 3/2012 | Fleury et al. |
| 8,146,005 B2 | 3/2012 | Jones et al. |
| 8,151,191 B2 | 4/2012 | Nicol |
| 8,384,719 B2 | 2/2013 | Reville et al. |
| RE44,054 E | 3/2013 | Kim |
| 8,396,708 B2 | 3/2013 | Park et al. |

(Continued)

FOREIGN PATENT DOCUMENTS

| CN | 109863532 | 6/2019 |
|---|---|---|
| CN | 110168478 | 8/2019 |

(Continued)

*Primary Examiner* — Hyun Soo Kim
(74) *Attorney, Agent, or Firm* — SCHWEGMAN LUNDBERG & WOESSNER, P.A.

(57) ABSTRACT

Systems, methods, and non-transitory computer-readable media for a personalized avatar experience during a system boot process.

16 Claims, 9 Drawing Sheets

(56) References Cited

U.S. PATENT DOCUMENTS

| | | |
|---|---|---|
| 8,425,322 B2 | 4/2013 | Gillo et al. |
| 8,458,601 B2 | 6/2013 | Castelli et al. |
| 8,462,198 B2 | 6/2013 | Lin et al. |
| 8,484,158 B2 | 7/2013 | Deluca et al. |
| 8,495,503 B2 | 7/2013 | Brown et al. |
| 8,495,505 B2 | 7/2013 | Smith et al. |
| 8,504,926 B2 | 8/2013 | Wolf |
| 8,559,980 B2 | 10/2013 | Pujol |
| 8,564,621 B2 | 10/2013 | Branson et al. |
| 8,564,710 B2 | 10/2013 | Nonaka et al. |
| 8,581,911 B2 | 11/2013 | Becker et al. |
| 8,597,121 B2 | 12/2013 | Andres del Valle |
| 8,601,051 B2 | 12/2013 | Wang |
| 8,601,379 B2 | 12/2013 | Marks et al. |
| 8,632,408 B2 | 1/2014 | Gillo et al. |
| 8,648,865 B2 | 2/2014 | Dawson et al. |
| 8,659,548 B2 | 2/2014 | Hildreth |
| 8,683,354 B2 | 3/2014 | Khandelwal et al. |
| 8,692,830 B2 | 4/2014 | Nelson et al. |
| 8,810,513 B2 | 8/2014 | Ptucha et al. |
| 8,812,171 B2 | 8/2014 | Filev et al. |
| 8,832,201 B2 | 9/2014 | Wall |
| 8,832,552 B2 | 9/2014 | Arrasvuori et al. |
| 8,839,327 B2 | 9/2014 | Amento et al. |
| 8,890,926 B2 | 11/2014 | Tandon et al. |
| 8,892,999 B2 | 11/2014 | Nims et al. |
| 8,924,250 B2 | 12/2014 | Bates et al. |
| 8,963,926 B2 | 2/2015 | Brown et al. |
| 8,989,786 B2 | 3/2015 | Feghali |
| 9,086,776 B2 | 7/2015 | Ye et al. |
| 9,105,014 B2 | 8/2015 | Collet et al. |
| 9,241,184 B2 | 1/2016 | Weerasinghe |
| 9,256,860 B2 | 2/2016 | Herger et al. |
| 9,298,257 B2 | 3/2016 | Hwang et al. |
| 9,314,692 B2 | 4/2016 | Konoplev et al. |
| 9,330,483 B2 | 5/2016 | Du et al. |
| 9,357,174 B2 | 5/2016 | Li et al. |
| 9,361,510 B2 | 6/2016 | Yao et al. |
| 9,378,576 B2 | 6/2016 | Bouaziz et al. |
| 9,402,057 B2 | 7/2016 | Kaytaz et al. |
| 9,412,192 B2 | 8/2016 | Mandel et al. |
| 9,460,541 B2 | 10/2016 | Li et al. |
| 9,489,760 B2 | 11/2016 | Li et al. |
| 9,503,845 B2 | 11/2016 | Vincent |
| 9,508,197 B2 | 11/2016 | Quinn et al. |
| 9,544,257 B2 | 1/2017 | Ogundokun et al. |
| 9,576,400 B2 | 2/2017 | Van Os et al. |
| 9,589,357 B2 | 3/2017 | Li et al. |
| 9,592,449 B2 | 3/2017 | Barbalet et al. |
| 9,648,376 B2 | 5/2017 | Chang et al. |
| 9,697,635 B2 | 7/2017 | Quinn et al. |
| 9,706,040 B2 | 7/2017 | Kadirvel et al. |
| 9,744,466 B2 | 8/2017 | Fujioka |
| 9,746,990 B2 | 8/2017 | Anderson et al. |
| 9,749,270 B2 | 8/2017 | Collet et al. |
| 9,792,714 B2 | 10/2017 | Li et al. |
| 9,839,844 B2 | 12/2017 | Dunstan et al. |
| 9,883,838 B2 | 2/2018 | Kaleal, III et al. |
| 9,898,849 B2 | 2/2018 | Du et al. |
| 9,911,073 B1 | 3/2018 | Spiegel et al. |
| 9,936,165 B2 | 4/2018 | Li et al. |
| 9,959,037 B2 | 5/2018 | Chaudhri et al. |
| 9,980,100 B1 | 5/2018 | Charlton et al. |
| 9,990,373 B2 | 6/2018 | Fortkort |
| 10,039,988 B2 | 8/2018 | Lobb et al. |
| 10,097,492 B2 | 10/2018 | Tsuda et al. |
| 10,116,598 B2 | 10/2018 | Tucker et al. |
| 10,155,168 B2 | 12/2018 | Blackstock et al. |
| 10,242,477 B1 | 3/2019 | Charlton et al. |
| 10,242,503 B2 | 3/2019 | McPhee et al. |
| 10,262,250 B1 | 4/2019 | Spiegel et al. |
| 10,362,219 B2 | 7/2019 | Wilson et al. |
| 10,475,225 B2 | 11/2019 | Park et al. |
| 10,504,266 B2 | 12/2019 | Blattner et al. |
| 10,573,048 B2 | 2/2020 | Ni et al. |
| 10,657,701 B2 | 5/2020 | Osman et al. |
| 2002/0067362 A1 | 6/2002 | Agostino Nocera et al. |
| 2002/0169644 A1 | 11/2002 | Greene |
| 2004/0130557 A1* | 7/2004 | Lin ............... G06F 9/4401 345/619 |
| 2005/0162419 A1 | 7/2005 | Kim et al. |
| 2005/0206610 A1 | 9/2005 | Cordelli |
| 2006/0294465 A1 | 12/2006 | Ronen et al. |
| 2007/0022282 A1* | 1/2007 | Chang ............ G06F 9/4401 713/2 |
| 2007/0110408 A1* | 5/2007 | Chang ............ H04N 5/85 386/331 |
| 2007/0113181 A1 | 5/2007 | Blattner et al. |
| 2007/0168863 A1 | 7/2007 | Blattner et al. |
| 2007/0176921 A1 | 8/2007 | Iwasaki et al. |
| 2008/0010447 A1* | 1/2008 | Liao ............... G06F 9/4401 713/2 |
| 2008/0158222 A1 | 7/2008 | Li et al. |
| 2009/0016617 A1 | 1/2009 | Bregman-Amitai et al. |
| 2009/0055484 A1 | 2/2009 | Vuong et al. |
| 2009/0070688 A1 | 3/2009 | Gyorfi et al. |
| 2009/0099925 A1 | 4/2009 | Mehta et al. |
| 2009/0106672 A1 | 4/2009 | Burstrom |
| 2009/0158170 A1 | 6/2009 | Narayanan et al. |
| 2009/0177976 A1 | 7/2009 | Bokor et al. |
| 2009/0202114 A1 | 8/2009 | Morin et al. |
| 2009/0265604 A1 | 10/2009 | Howard et al. |
| 2009/0300525 A1 | 12/2009 | Jolliff et al. |
| 2009/0303984 A1 | 12/2009 | Clark et al. |
| 2010/0009747 A1* | 1/2010 | Reville ............ A63F 13/30 463/31 |
| 2010/0011422 A1 | 1/2010 | Mason et al. |
| 2010/0023885 A1 | 1/2010 | Reville et al. |
| 2010/0115426 A1 | 5/2010 | Liu et al. |
| 2010/0162149 A1 | 6/2010 | Sheleheda et al. |
| 2010/0203968 A1 | 8/2010 | Gill et al. |
| 2010/0227682 A1 | 9/2010 | Reville et al. |
| 2011/0093780 A1 | 4/2011 | Dunn |
| 2011/0115798 A1 | 5/2011 | Nayar et al. |
| 2011/0148864 A1 | 6/2011 | Lee et al. |
| 2011/0197055 A1* | 8/2011 | Spottswood ...... G06F 9/4401 713/2 |
| 2011/0239136 A1 | 9/2011 | Goldman et al. |
| 2012/0113106 A1 | 5/2012 | Choi et al. |
| 2012/0124458 A1 | 5/2012 | Cruzada |
| 2012/0130717 A1 | 5/2012 | Xu et al. |
| 2013/0042098 A1* | 2/2013 | Baik ............... G06F 9/445 713/2 |
| 2013/0103760 A1 | 4/2013 | Golding et al. |
| 2013/0201187 A1 | 8/2013 | Tong et al. |
| 2013/0249948 A1 | 9/2013 | Reitan |
| 2013/0257877 A1 | 10/2013 | Davis |
| 2014/0043329 A1 | 2/2014 | Wang et al. |
| 2014/0055554 A1 | 2/2014 | Du et al. |
| 2014/0125678 A1 | 5/2014 | Wang et al. |
| 2014/0129343 A1 | 5/2014 | Finster et al. |
| 2015/0006875 A1* | 1/2015 | Jung ............... G06F 9/4403 713/2 |
| 2015/0206349 A1 | 7/2015 | Rosenthal et al. |
| 2016/0129350 A1* | 5/2016 | Khalsa ............ G06Q 30/0209 463/31 |
| 2016/0134840 A1 | 5/2016 | Mcculloch |
| 2016/0234149 A1 | 8/2016 | Tsuda et al. |
| 2017/0080346 A1 | 3/2017 | Abbas |
| 2017/0087473 A1 | 3/2017 | Siegel et al. |
| 2017/0113140 A1 | 4/2017 | Blackstock et al. |
| 2017/0118145 A1 | 4/2017 | Aittoniemi et al. |
| 2017/0199855 A1 | 7/2017 | Fishbeck |
| 2017/0235848 A1 | 8/2017 | Van Dusen et al. |
| 2017/0310934 A1 | 10/2017 | Du et al. |
| 2017/0312634 A1 | 11/2017 | Ledoux et al. |
| 2018/0047200 A1 | 2/2018 | O'hara et al. |
| 2018/0113587 A1 | 4/2018 | Allen et al. |
| 2018/0115503 A1 | 4/2018 | Baldwin et al. |
| 2018/0315076 A1 | 11/2018 | Andreou |
| 2018/0315133 A1 | 11/2018 | Brody et al. |
| 2018/0315134 A1 | 11/2018 | Amitay et al. |
| 2019/0001223 A1 | 1/2019 | Blackstock et al. |

(56) References Cited

U.S. PATENT DOCUMENTS

| | | |
|---|---|---|
| 2019/0057616 A1 | 2/2019 | Cohen et al. |
| 2019/0188920 A1 | 6/2019 | Mcphee et al. |
| 2020/0073773 A1* | 3/2020 | Liu .................. G06F 9/4406 |
| 2021/0279930 A1* | 9/2021 | Hutten ................ G06T 11/00 |

FOREIGN PATENT DOCUMENTS

| | | | |
|---|---|---|---|
| EP | 2184092 | 5/2010 | |
| JP | 2001230801 | 8/2001 | |
| JP | 5497931 | 3/2014 | |
| KR | 101445263 | 9/2014 | |
| WO | 2003094072 | 11/2003 | |
| WO | 2004095308 | 11/2004 | |
| WO | 2006107182 | 10/2006 | |
| WO | WO-2006129942 A2 * | 12/2006 | ............ F24F 11/30 |
| WO | 2007134402 | 11/2007 | |
| WO | 2012139276 | 10/2012 | |
| WO | 2013027893 | 2/2013 | |
| WO | 2013152454 | 10/2013 | |
| WO | 2013166588 | 11/2013 | |
| WO | 2014031899 | 2/2014 | |
| WO | 2014194439 | 12/2014 | |
| WO | 2016090605 | 6/2016 | |
| WO | 2018081013 | 5/2018 | |
| WO | 2018102562 | 6/2018 | |
| WO | 2018129531 | 7/2018 | |
| WO | 2019089613 | 5/2019 | |

\* cited by examiner

PERSONALIZED AVATAR EXPERIENCE DURING A SYSTEM BOOT PROCESS

RELATED APPLICATIONS

This application claims benefit of priority from U.S. Provisional Patent Application Ser. No. 63/190,413, filed on May 19, 2021.

TECHNICAL FIELD

An embodiment of the present subject matter relates generally to system startup and, more specifically, to a personalized avatar experience during a system boot process.

BACKGROUND

A computing device undergoes a system startup process (boot process) when it is powered on. During the boot process the computing device is configured for operation. For example, the computer processor accesses instructions in the system Read-Only Memory (ROM), known as the system Basic Input/Output System (BIOS), and executes the instructions. This generally causes the computing device to 'wake up' peripheral equipment and search for the boot device, which may either load the operating system or access it from another location.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
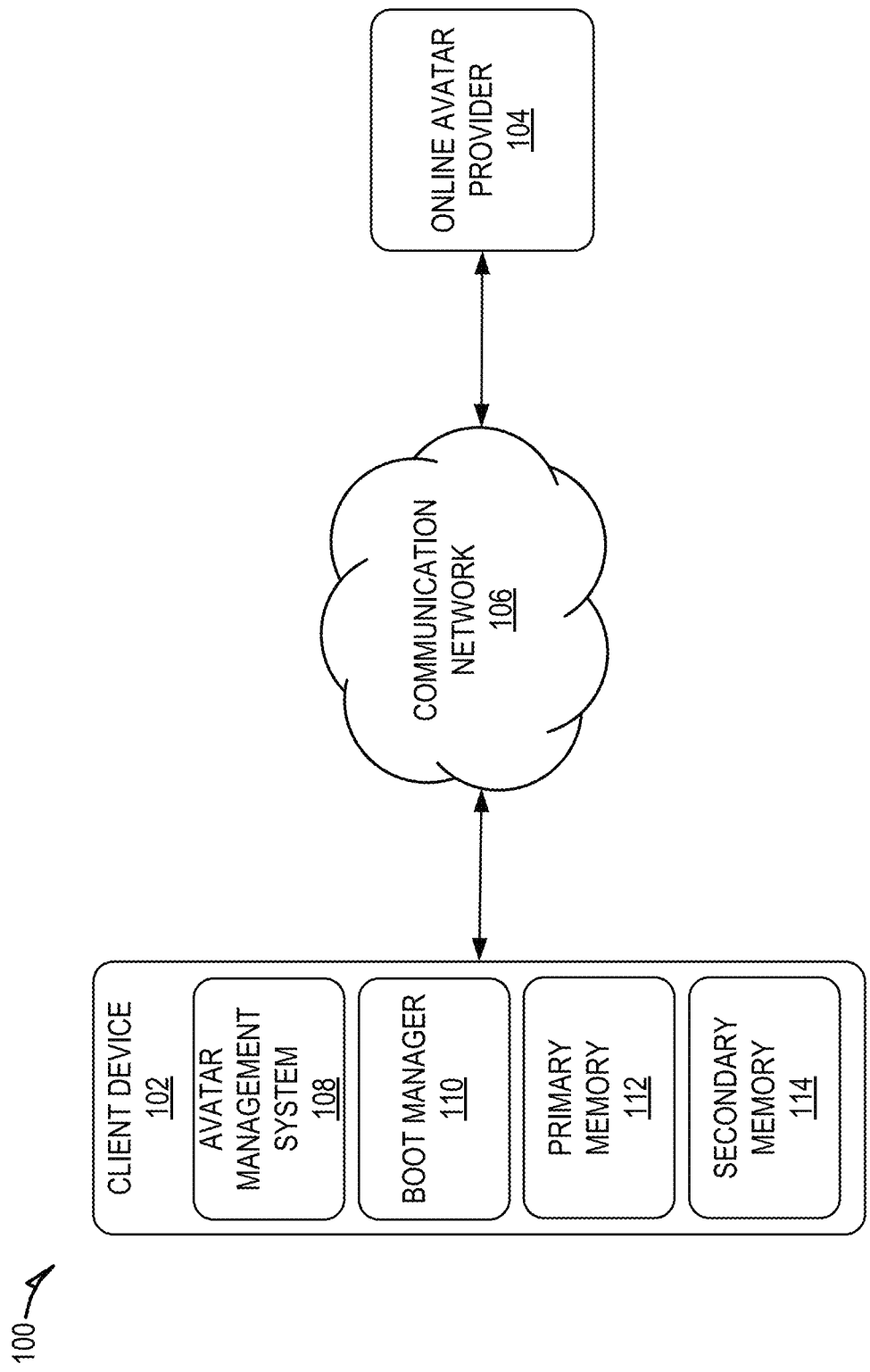
FIG. 1 shows a block diagram of a personalized avatar experience during a system boot process, according to some example embodiments.

In the following description, for purposes of explanation, various details are set forth in order to provide a thorough understanding of some example embodiments. It will be apparent, however, to one skilled in the art, that the present subject matter may be practiced without these specific details, or with slight alterations.

Reference in the specification to "one embodiment" or "an embodiment" means that a particular feature, structure, or characteristic described in connection with the embodiment is included in at least one embodiment of the present subject matter. Thus, the appearances of the phrase "in one embodiment" or "in an embodiment" appearing in various places throughout the specification are not necessarily all referring to the same embodiment.

For purposes of explanation, specific configurations and details are set forth in order to provide a thorough understanding of the present subject matter. However, it will be apparent to one of ordinary skill in the art that embodiments of the subject matter described may be practiced without the specific details presented herein, or in various combinations, as described herein. Furthermore, well-known features may be omitted or simplified in order not to obscure the described embodiments. Various examples may be given throughout this description. These are merely descriptions of specific embodiments. The scope or meaning of the claims is not limited to the examples given.

The term "augmented reality" (AR) is used herein to refer to an interactive experience of a real-world environment where physical objects that reside in the real-world are "augmented" or enhanced by computer-generated digital content (also referred to as virtual content or synthetic content). AR can also refer to a system that enables a combination of real and virtual worlds, real-time interaction, and 3D registration of virtual and real objects. A user of an AR system perceives virtual content that appear to be attached or interact with a real-world physical object.

Disclosed are systems, methods, and non-transitory computer-readable media for a personalized avatar experience during a system boot process. A computing device undergoes a system boot process (e.g., system startup process) when it is powered on. Current system boot processes are performed generically without any consideration for the end user. For example, a user is generally presented with a default screen or graphic during the boot process. As a result, the user may be unsure as to whether the boot process is operating correctly and/or become unengaged with the boot process altogether.

To alleviate these issues, an avatar management system provides for a personalized avatar experience during the boot process. An avatar is a digital icon or figure representing a person. An avatar can be personalized to represent a particular user. For example, a user may provide information to customize the avatar, such as choosing the hair color, hair style, eyes, clothes, and the like. The avatar management system causes presentation of a user's personalized avatar during the boot process on the user's client device. For example, the avatar management system accesses the personalized avatar from an online avatar provider and updates the system firmware on the user's client device to cause presentation of the personalized avatar during the boot process. When a user starts up the client device, the boot manager accesses the avatar from the firmware and causes presentation of the avatar on a display of the client device during the boot process.

In some embodiments, presentation of the avatar may be modified during the boot process. For example, an early boot image of the avatar may initially be presented during the boot process, after which a main boot animation of the avatar is presented in place of the early boot image. The early boot image may be a static image or simple animation, while the main boot animation may be a more advanced animation or image associated with a theme. The early boot image may be stored in the firmware of the client device to allow for presentation of the boot image early in the boot process, while the main boot animation may be presented during initiation of the operating system.

In some embodiments, the main boot animation may be reactive to the progress of the boot process. For example, the main boot animation may update to indicate the progress of the boot process, such as by modifying the animation or the avatar based on the progress, presenting status information indicating the progress of the boot process, and the like. The main boot animation may be replaced with a start screen when the boot process has completed.

FIG. 1 shows a block diagram of a system 100 for providing a personalized avatar experience during a system boot process. As shown, multiple devices (i.e., client device 102 and online avatar provider 104) are connected to a communication network 106 and configured to communicate with each other through use of the communication network 106. The communication network 106 is any type of network, including a local area network (LAN), such as an intranet, a wide area network (WAN), such as the internet, a telephone and mobile device network, such as cellular network, or any combination thereof. Further, the communication network 106 may be a public network, a private network, or a combination thereof. The communication network 106 is implemented using any number of communication links associated with one or more service providers, including one or more wired communication links, one or more wireless communication links, or any combination thereof. Additionally, the communication network 106 is configured to support the transmission of data formatted using any number of protocols.

Multiple computing devices can be connected to the communication network 106. A computing device is any type of general computing device capable of network communication with other computing devices. For example, a computing device can be a personal computing device such as a desktop or workstation, a business server, or a portable computing device, such as a laptop, smart phone, or a tablet personal computer (PC). A computing device can include some or all of the features, components, and peripherals of the machine 700 shown in FIG. 7.

To facilitate communication with other computing devices, a computing device includes a communication interface configured to receive a communication, such as a request, data, and the like, from another computing device in network communication with the computing device and pass the communication along to an appropriate module running on the computing device. The communication interface also sends a communication to another computing device in network communication with the computing device.

The online avatar provider 104 is one or more computing devices that enable users to create personalized avatars. Users communicate with and utilize the functionality provided by the online avatar provider 104 by using a client device 102 that is connected to the communication network 106 by direct and/or indirect communication.

Although the shown system 100 includes only one client device 102 and one online avatar provider 104, this is only for ease of explanation and is not meant to be limiting. One skilled in the art would appreciate that the system 100 can include any number of client devices 102 and/or online avatar providers 104. Further, each online avatar provider 104 may concurrently accept communications from and initiate communication messages and/or interact with any number of client devices 102 and support connections from a variety of different types of client devices 102, such as desktop computers; mobile computers; mobile communications devices, e.g., mobile phones, smart phones, tablets; smart televisions; set-top boxes; and/or any other network enabled computing devices. Hence, the client device 102 may be of varying type, capabilities, operating systems, and so forth.

A user interacts with the online avatar provider 104 via a client-side application installed on the client device 102. In some embodiments, the client-side application includes a component specific to the online avatar provider 104. For example, the component may be a stand-alone application, one or more application plug-ins, and/or a browser extension. However, the users may also interact with the online avatar provider 104 via a third-party application, such as a web browser, that resides on the client device 102 and is configured to communicate with the online avatar provider 104. In either case, the client-side application presents a user interface (UI) for the user to interact with the online avatar provider 104. For example, the user interacts with the online avatar provider 104 via a client-side application integrated with the file system or via a webpage displayed using a web browser application.

The online avatar provider 104 enables users to create personalized avatars. An avatar is a digital icon or figure representing a person, animal, and the like. The online avatar provider 104 allows users to generate a personalized avatar. For example, the online avatar provider 104 provides an avatar user interface that allows users to provide information to customize the avatar. This may include selecting physical attributes of the avatar, such as choosing the hair color, hair style, face shape, eye color, gender, clothing, and the like. This may also include selecting a theme associated with the avatar. A theme is a narrative or setting for the avatar. For example, the theme may be an activity, such as playing basketball, dancing, and the like. As anther example, the theme may be a holiday, such as Christmas, New Years, and the like. As another example, a theme may be based on an entity, such a university, sports team, and the like.

The online avatar provider 104 stores the information provided by a user for use in generating a personalized avatar for the user. For example, the online avatar provider 104 may associate the information with an account of the user. The online avatar provider 104 may generate a personalized avatar based on the information provided by the user and store the personalized avatar for subsequent use. For example, the online avatar provider 104 may return the stored personalized avatar in response to a request. Alternatively, the online avatar provider 104 may generate the personalized avatar in response to receiving a request. For example, the online avatar provider 104 may receive a request to return a personalized avatar associated with an account, access the information associated with account in response to receiving the request, and then generate the personalized avatar based on the accessed information. The online avatar provider 104 may then return the generated personalized avatar in response to the request.

The client device 102 is any type of computing device of a user. For example, the client device 102 may be a laptop, desktop, smart phone, tablet, Augmented Reality (AR) headset, and the like. The client device 102 undergoes a system boot process (e.g., system startup process) when it is powered on. During the boot process, the client device 102 is initialized for use by the user. For example, during the boot process, peripheral equipment, such as the microphone, cameras, display, keyboard, and the like, are initiated for use and the operating system is executed. The boot manager 110 facilitates the boot process for the client device 102. As part of the boot process, the boot manager 110 initially accesses firmware stored in the primary memory 112 of the client device 102. The primary memory 112 is a main memory that is internal to the client device 102 and has direct access to the Computer Processing Unit (CPU) of the client device 102. Instructions stored in the primary memory 112 may be executed by the CPU directly from the primary memory 112. Examples of primary memory 112 include Random Access Memory (RAM) and Read-Only Memory (ROM).

The firmware includes instructions for initiating the boot process. For example, the firmware includes instructions for initiating peripheral equipment, such as the microphone, cameras, display, keyboard, and the like, as well as instruction for initiating the operating system. Accordingly, the boot manager 110 executes the instructions included in the firmware to initiate the boot process. The instructions may include accessing data from the secondary memory 114. In contrast to the primary memory 112, the secondary memory 114 may not be internal to the client device 102 and/or have direct access to the CPU. Examples of secondary memory 114 include hard drives, optical media, and the like. Data for executing the operating system may be stored in the secondary memory 114. The boot manager 110 may access this data from the secondary memory 114 to initiate the operating system during the boot process.

As explained earlier, current boot processes are performed generically without any consideration for the end user. For example, a user is generally presented with a default screen or graphic during the boot process. As a result, the user may be unsure as to whether the boot process is operating correctly and/or become unengaged with the boot process altogether. This issue may be particularly relevant when booting mobile type client devices 102, such AR headsets.

To alleviate these issues, the client device 102 includes an avatar management system 108 that provides for a personalized avatar experience during the boot process. The avatar management system 108 causes presentation of a user's personalized avatar during the boot process on the client device 102. For example, the avatar management system 108 accesses the user's personalized avatar from the online avatar provider 104 and updates the system firmware stored in the primary memory 112 of the client device to cause presentation of the personalized avatar during the boot process. For example, the avatar management system 108 may store an image within the firmware to be initiated during the boot process and/or update the instructions included in the firmware to cause the avatar to be accessed from a specified location (e.g., the secondary memory 114, the online avatar provider 104) during the boot process.

When a user starts up the client device 102, the boot manager 110 accesses the firmware from the primary memory 112 and causes presentation of the avatar on a display of the client device 102 during the boot process. For example, the boot manager 110 may cause presentation of an image depicting the personalized avatar added to the firmware stored in the primary memory 112 and/or executes the instructions included in the firmware to cause presentation of the personalized avatar.

In some embodiments, presentation of the avatar may be modified during the boot process. For example, an early boot image of the avatar that is stored in the firmware may initially be presented during the boot process, after which a main boot animation of the avatar accessed from a separate location, such as the secondary memory 114 or the online avatar provider 104, is presented in place of the early boot image. The early boot image may be a static image or simple animation, while the main boot animation may be a more advanced animation or image associated with a theme. The early boot image may be stored in the firmware to allow for presentation early in the boot process, while the main boot animation may be presented during initiation of the operating system.

In some embodiments, the main boot animation may be reactive to the progress of the boot process. For example, the main boot animation may update to indicate the progress of the boot process, such as by modifying the animation of the avatar based on the progress of the boor process, presenting status information indicating the progress of the boot process, and the like. The main boot animation may be replaced with a start screen when the boot process has completed.

Figure 2:
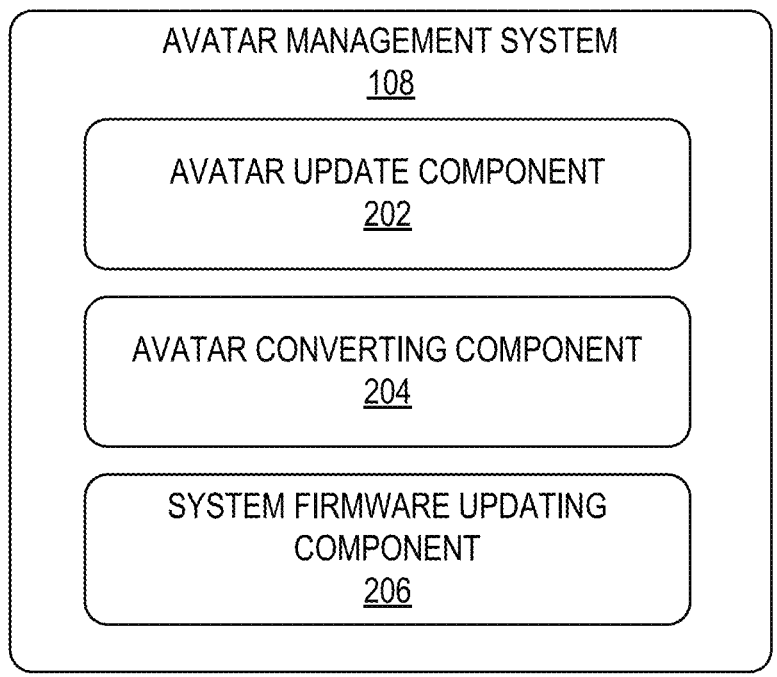
FIG. 2 is a block diagram of an avatar management system, according to some example embodiments.

FIG. 2 is a block diagram of an avatar management system 108, according to some example embodiments. To avoid obscuring the inventive subject matter with unnecessary detail, various functional components (e.g., modules) that are not germane to conveying an understanding of the inventive subject matter have been omitted from FIG. 2. However, a skilled artisan will readily recognize that various additional functional components may be supported by the avatar management system 108 to facilitate additional functionality that is not specifically described herein. Furthermore, the various functional modules depicted in FIG. 2 may reside on a single computing device or may be distributed across several computing devices in various arrangements such as those used in cloud-based architectures.

As shown, the avatar management system 108 includes an avatar update component 202, an avatar converting component 204 and a system firmware updating component 206.

The avatar update component 202 accesses a user's personalized avatar from the online avatar provider 104. For example, the avatar update component 202 communicates with the online avatar provider 104 via the communication network 106 to request a user's personalized avatar. The avatar update component 202 may provides the online avatar provider 104 with the user's credentials and/or a secure unique token to authenticate the request for the personalized avatar. In response, the online avatar provider 104 returns the personalized avatar to the client device 102. For example, the online avatar provider 104 may access a previously generated version of the personalized avatar from storage and return the personalized avatar to the client device 102.

Alternatively, the online avatar provider 104 may generate the personalized avatar in response to receiving a request from the avatar update component 202. For example, the online avatar provider 104 may access the stored information provided by the user to customize the avatar and generate the avatar based on the accessed information. In this type of embodiment, the personalized avatar returned to the client device 102 may be varied per request based on data included in the request. For example, the avatar update component 202 may include data in the request, such as data identifying a theme, which the online avatar provider 104 uses to generate the personalized avatar.

In this type of embodiment, the avatar update component 202 may select a theme when transmitting a request to the online avatar provider 104. The avatar update component 202 may select the theme based on any of a variety of types of data, such as a current day/time, location of the client device 102, recent activity of the user, and the like. For example, the avatar update component 202 may select the theme based on an upcoming holiday or other event, such as selecting a Christmas theme in December, or select a football theme around the date of the Super bowl. As another example, the avatar update component 202 may select the theme based on the location of the client device 102, such as selecting a Hollywood theme when the client device 102 is located in Los Angeles, or selecting a beach theme when the client device 102 is determined to be within a predetermined distance of the ocean.

The avatar update component 202 may provide the received personalized avatar to the other components of the avatar management system 108 and/or store the personalized avatar in the secondary memory 114.

The avatar update component 202 may request the personalized avatar from the online avatar provider 104 at varying times. For example, the avatar update component 202 may be configured to request the personalized avatar based on a specified time schedule, such as at specified time intervals. As another example, the avatar update component 202 may be configured to request the personalized avatar in response to satisfaction of specified triggering events, such as the client device 102 being powered on, the location of the client device 102 entering or changing geographic regions, and the like.

The avatar converting component 204 converts the personalized avatar into formats that are compatible with the client device 102. While the avatar converting component 204 is shown as being part of the avatar management system 108, the functionality of the avatar converting component 204 may be implemented and the online avatar provider 104, the avatar management system 108, or a combination of the two.

The avatar converting component 204 converts the personalized avatar based on the system components of the client device 102. For example the avatar converting component 204 converts the personalized avatar into a format that is compatible with the system components of the client device 102. Accordingly, the avatar converting component 204 accesses data indicating the system components of the client device 102 for use in converting the personalized avatar.

The avatar converting component 204 may generate multiple versions of the avatar for use at various stages of the boot process. For example, the avatar converting component 204 may generate an early boot image of the avatar and a main boot animation of the avatar. The early boot image may be a static image or simple animation, while the main boot animation may be a more advanced animation or image associated with a theme. The avatar converting component 204 may provide the resulting converted avatar images and/or animations to the other components of the avatar management system 108 and/or store the them in the secondary memory 114.

The system firmware updating component 206 updates the firmware of the client device 102 to provide for a personalized avatar experience during the boot process. For example, the system firmware updating component 206 updates the firmware to include an early boot image of the avatar. The system firmware updating component 206 may also update the instructions for initiating the boot process to cause presentation of a personalized avatar experience. This may include adding instruction to cause presentation of the early boot image and/or main boot animation. For example, the instructions may identify the location of the early boot image and/or main boot image, a time at which to cause presentation of each, instructions for modifying presentation of the main boot animation based on progress of the boot process, and the like.

Presentation of the avatar may be modified during the boot process. For example, an early boot image of the avatar may initially be presented during the boot process, after which a main boot animation of the avatar is presented in place of the early boot image. Further, the main boot animation may be reactive to the progress of the boot process. For example, the main boot animation may be updated to indicate the progress of the boot process, such as by modifying the animation of the avatar based on the progress, presenting status information indicating the progress of the boot process, and the like. The main boot animation may also be replaced with a start screen when the boot process has completed.

Figure 3:
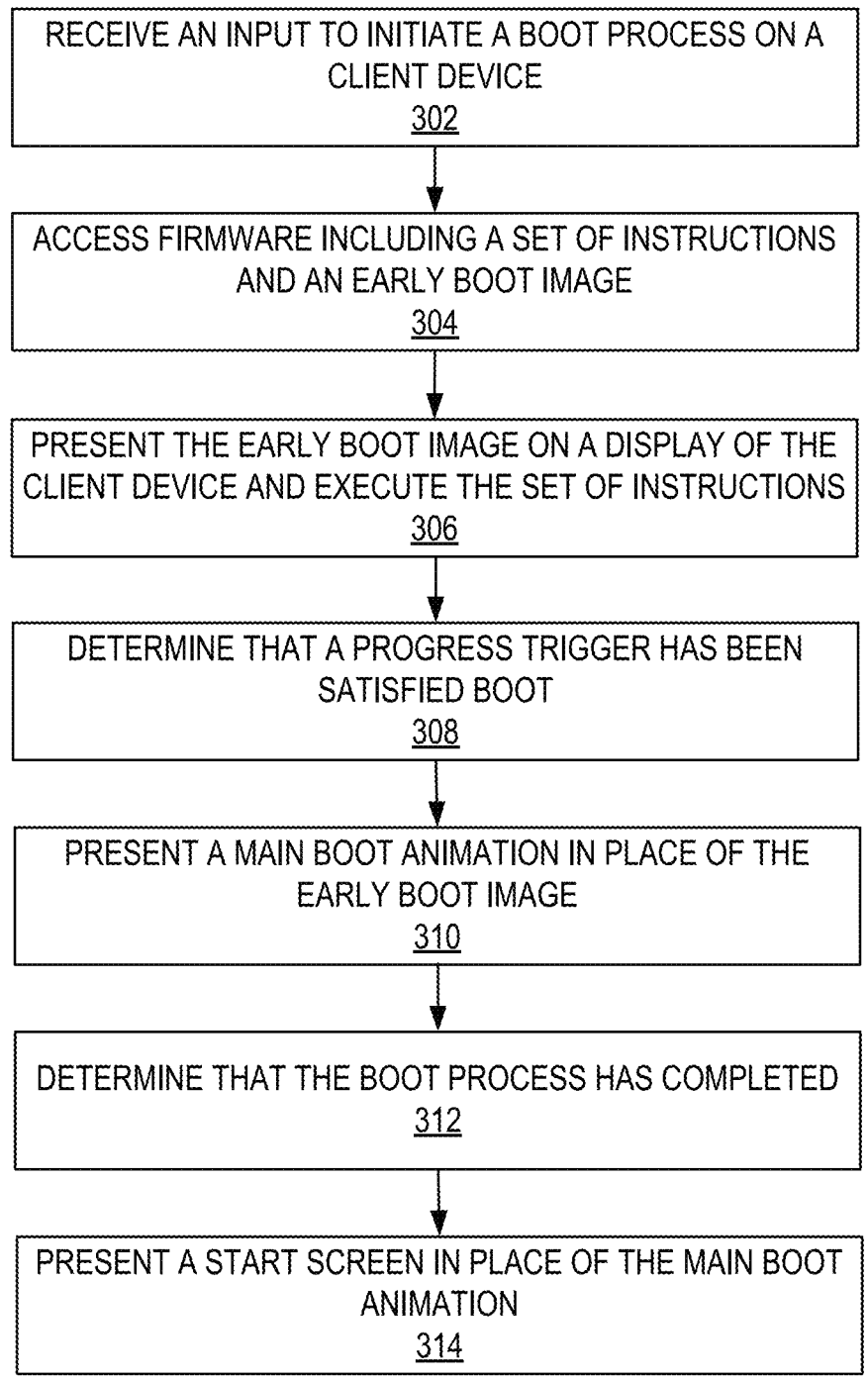
FIG. 3 is a flow diagram of a method for a personalized avatar experience during a system boot process, according to some example embodiments.

FIG. 3 is a flow diagram of a method 300 for a personalized avatar experience during a system boot process, according to some example embodiments. The method 300 may be embodied in computer readable instructions for execution by one or more computer processors such that the operations of the method 300 may be performed in part or in whole by a client device 102; accordingly, the method 300 is described below by way of example with reference to the client device 102. However, it shall be appreciated that at least some of the operations of the method 300 may be deployed on various other hardware and/or software configurations and the method 300 is not intended to be limited to the client device 102.

At operation 302, the boot manager 110 receives an input to initiate a boot process on a client device 102. For example, the input may be the result of a user selecting a power button to power up the client device 102.

At operation 304, the boot manager 110 accesses firmware including a set of instructions and an early boot image. The firmware is accessed from a primary memory 112 of the client device 102, such as ROM. The early boot image may be a static image or simple animation of the user's personalized avatar. Storing the early boot image in the firmware allows for presentation of the personalized avatar at an early stage during the boot process. The set of instructions provide instructions for initiating the boot process, such as instructions for accessing and loading an operating system of the client device 102.

At operation 306, the boot manager 110 presents the early boot image on a display of the client device 102 and executes the set of instructions.

At operation 308, the boot manager determines that a progress trigger has been satisfied. The progress trigger may be any type of trigger related to progress of the boot process, such as initiating loading of the operations system, executing a specific instruction in the set of instructions, and the like.

At operation 310, the boot manager presents a main boot animation in the place of the early boot image. The main boot animation may be an animation or image associated with a theme. The main boot animation may be accessed from the secondary memory 114 and/or the online avatar provider 104.

At operation 312, the boot manager 110 determines that the boot process has completed, and at operation 314 presents a start screen in place of the main boot image. Presenting the start screen signifies to the user that the boot process has been completed and the client device 102 is ready for use by the user.

Figure 4:
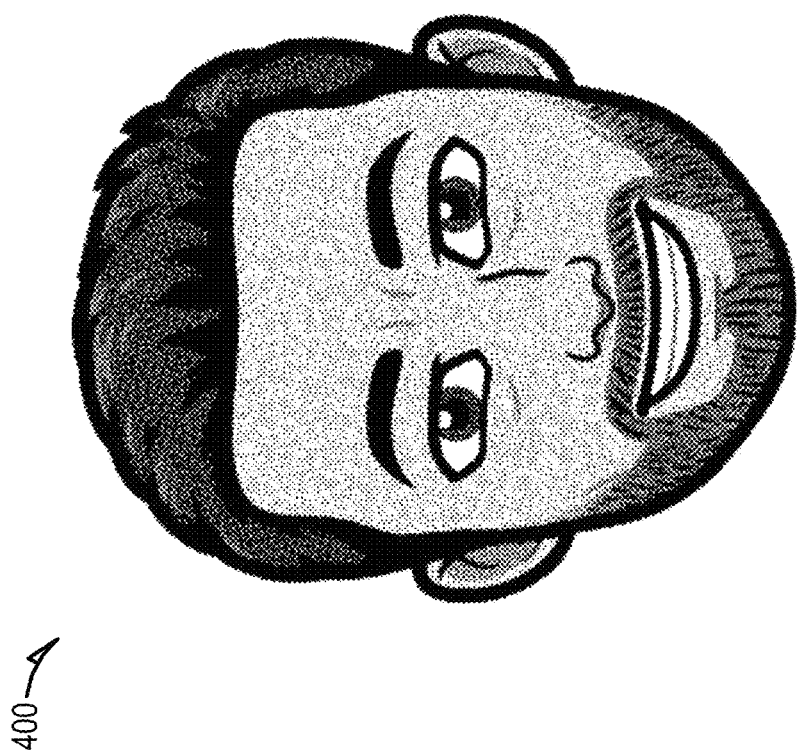
FIG. 4 shows an early boot image of a personalized avatar, according to some example embodiments.

FIG. 4 shows an early boot image 400 of a personalized avatar, according to some example embodiments. As shown the early boot image 400 is a black and white image of the personalized avatar. The personalized avatar represents a person and is generated based on information provided by a user. The early boot image 400 may be simple image to limit its size and allow for storage in the firmware.

Figure 5A:
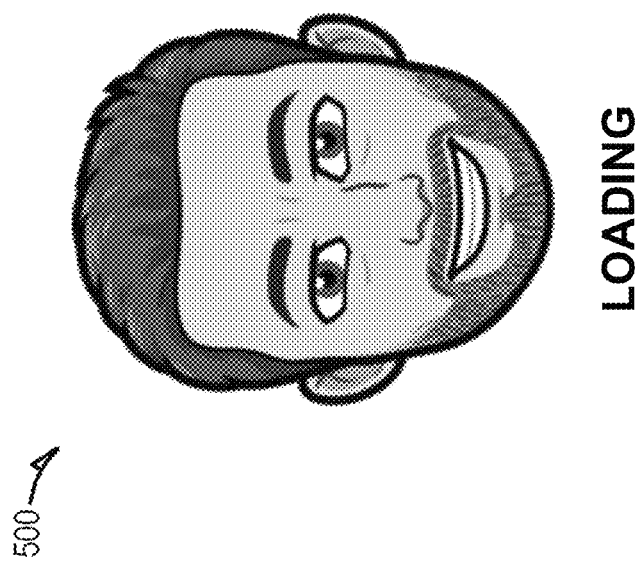
FIGS. 5A-5C show a main boot animation of a personalized avatar, according to some example embodiments.
Figure 5B:
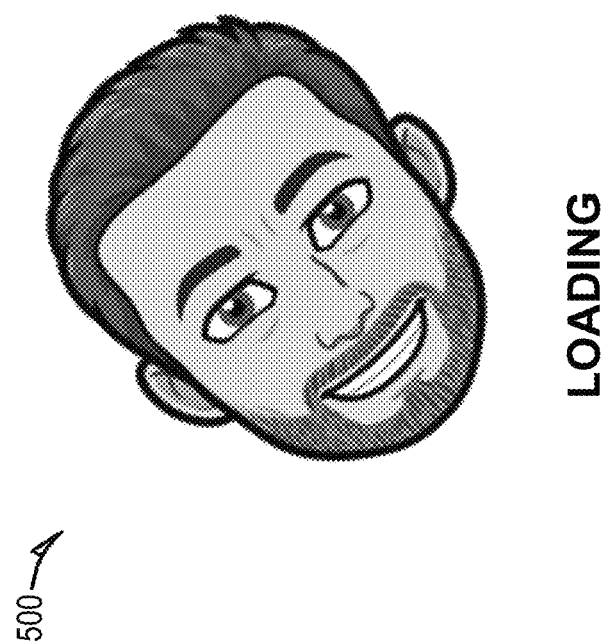
Figure 5C:
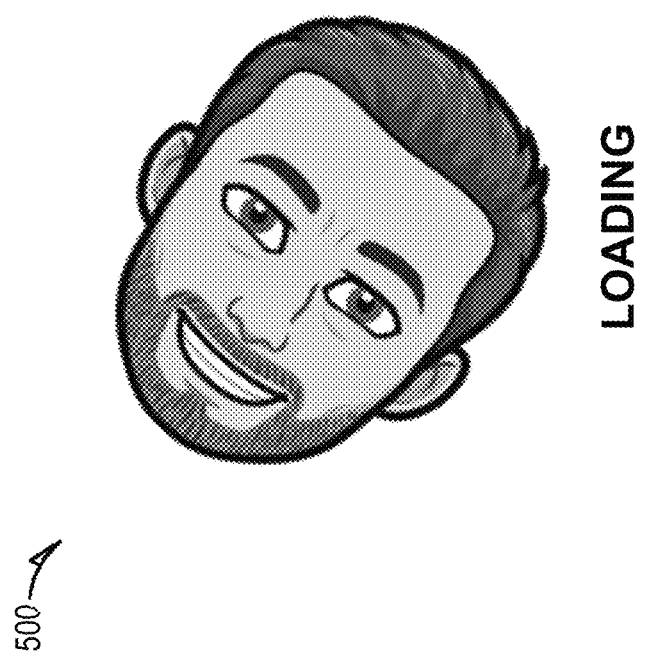

FIGS. 5A-5C show a main boot animation 500 of a personalized avatar, according to some example embodiments. As shown in FIG. 5A, the main boot animation 500 is a higher quality representation of the personalized avatar depicted by the early boot image 400 shown in FIG. 4. For example, the main boot animation 500 can be in color rather than black and white. The main boot animation 500 is also presented along with a notification indicating the status of the boot process. For example, the main boot animation 500 is presented along with the message "LOADING" to indicate the that boot process is in progress.

The main boot animation 500 is an animation, rather than a static image such as the early boot image 400 shown in FIG. 4. As shown in FIGS. 5B and 5C, the main boot animation 500 is animated by rotating in a clockwise manner. The animation further indicates to a user that the boot process is in progress. Unlike the early boot image 400 that is stored the firmware, the main boot animation 500 may be stored in the secondary memory 114 and/or at the online avatar provider 104. This allows for the main boot animation 500 to be a more advanced image or animation than the early boot image 400 as the limited storage capacity of the primary memory 112 is not a concern.

Software Architecture

Figure 6:
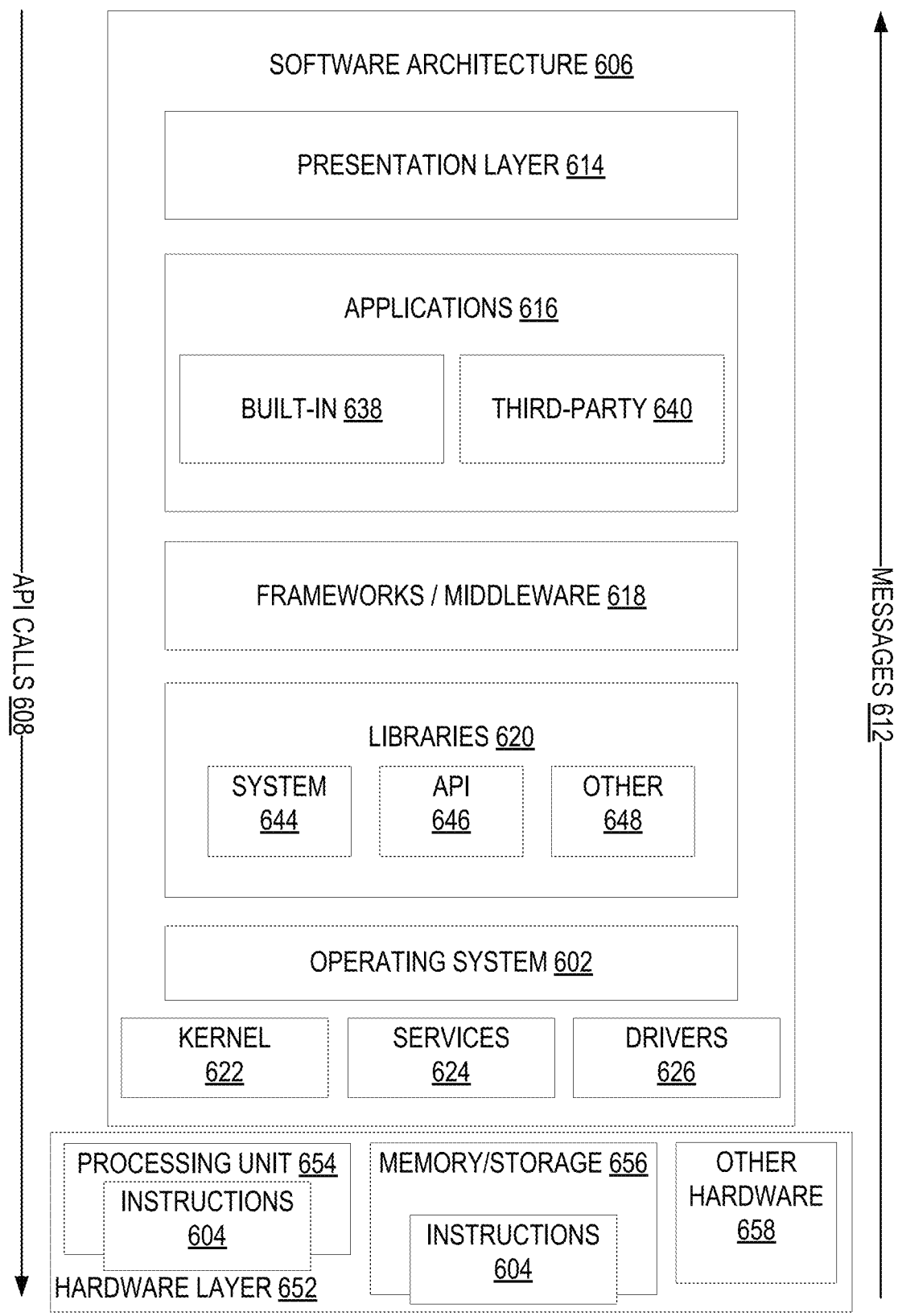
FIG. 6 is a block diagram illustrating components of a machine, according to some example embodiments, able to read instructions from a machine-readable medium (e.g., a machine-readable storage medium) and perform any one or more of the methodologies discussed herein.

FIG. 6 is a block diagram illustrating an example software architecture 606, which may be used in conjunction with various hardware architectures herein described. FIG. 6 is a non-limiting example of a software architecture 606 and it will be appreciated that many other architectures may be implemented to facilitate the functionality described herein. The software architecture 606 may execute on hardware such as machine 700 of FIG. 7 that includes, among other things, processors 704, memory 714, and (input/output) I/O components 718. A representative hardware layer 652 is illustrated and can represent, for example, the machine 700 of FIG. 7. The representative hardware layer 652 includes a processing unit 654 having associated executable instructions 604. Executable instructions 604 represent the executable instructions of the software architecture 606, including implementation of the methods, components, and so forth described herein. The hardware layer 652 also includes memory and/or storage modules 656, which also have executable instructions 604. The hardware layer 652 may also comprise other hardware 658.

In the example architecture of FIG. 6, the software architecture 606 may be conceptualized as a stack of layers where each layer provides particular functionality. For example, the software architecture 606 may include layers such as an operating system 602, libraries 620, frameworks/middleware 618, applications 616, and a presentation layer 614. Operationally, the applications 616 and/or other components within the layers may invoke application programming interface (API) calls 608 through the software stack and receive a response such as messages 612 in response to the API calls 608. The layers illustrated are representative in nature and not all software architectures have all layers. For example, some mobile or special purpose operating systems may not provide a frameworks/middleware 618, while others may provide such a layer. Other software architectures may include additional or different layers.

The operating system 602 may manage hardware resources and provide common services. The operating system 602 may include, for example, a kernel 622, services 624, and drivers 626. The kernel 622 may act as an abstraction layer between the hardware and the other software layers. For example, the kernel 622 may be responsible for memory management, processor management (e.g., scheduling), component management, networking, security settings, and so on. The services 624 may provide other common services for the other software layers. The drivers 626 are responsible for controlling or interfacing with the underlying hardware. For instance, the drivers 626 include display drivers, camera drivers, Bluetooth® drivers, flash memory drivers, serial communication drivers (e.g., Universal Serial Bus (USB) drivers), Wi-Fi® drivers, audio drivers, power management drivers, and so forth, depending on the hardware configuration.

The libraries 620 provide a common infrastructure that is used by the applications 616 and/or other components and/or layers. The libraries 620 provide functionality that allows other software components to perform tasks in an easier fashion than to interface directly with the underlying operating system 602 functionality (e.g., kernel 622, services 624, and/or drivers 626). The libraries 620 may include system libraries 644 (e.g., C standard library) that may provide functions such as memory allocation functions, string manipulation functions, mathematical functions, and the like. In addition, the libraries 620 may include API libraries 646 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 620 may also include a wide variety of other libraries 648 to provide many other APIs to the applications 616 and other software components/modules.

The frameworks/middleware 618 (also sometimes referred to as middleware) provide a higher-level common infrastructure that may be used by the applications 616 and/or other software components/modules. For example, the frameworks/middleware 618 may provide various graphical user interface (GUI) functions, high-level resource management, high-level location services, and so forth. The frameworks/middleware 618 may provide a broad spectrum of other APIs that may be used by the applications 616 and/or other software components/modules, some of which may be specific to a particular operating system 602 or platform.

The applications 616 include built-in applications 638 and/or third-party applications 640. Examples of representative built-in applications 638 may include, but are not limited to, a contacts application, a browser application, a book reader application, a location application, a media application, a messaging application, and/or a game application. Third-party applications 640 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 640 may invoke the API calls 608 provided by the mobile operating system (such as operating system 602) to facilitate functionality described herein.

The applications 616 may use built in operating system functions (e.g., kernel 622, services 624, and/or drivers 626), libraries 620, and frameworks/middleware 618 to create UIs to interact with users of the system. Alternatively, or additionally, in some systems, interactions with a user may occur through a presentation layer, such as presentation layer 614.

In these systems, the application/component "logic" can be separated from the aspects of the application/component that interact with a user.

Figure 7:
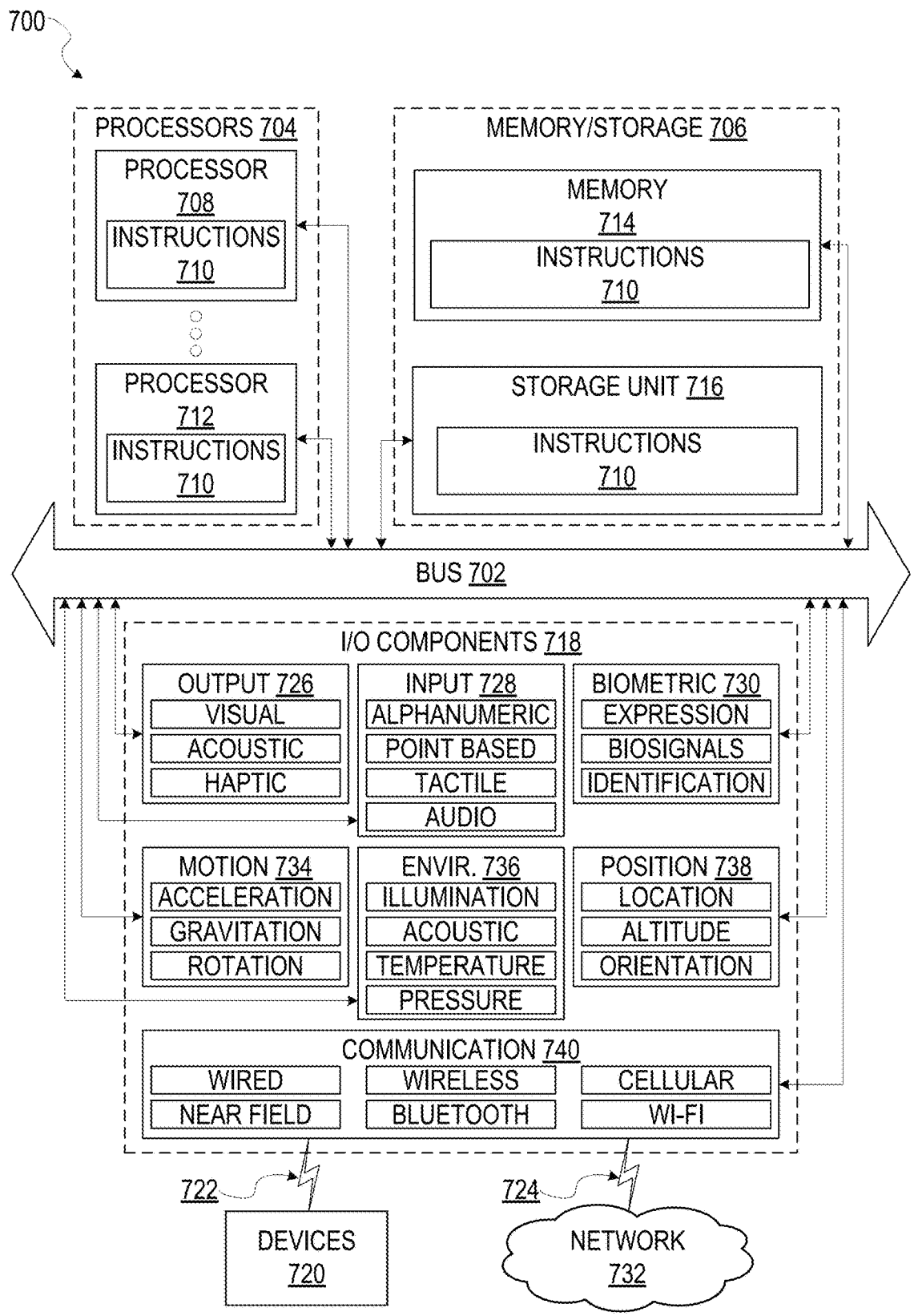
FIG. 7 is a block diagram illustrating components of a machine, according to some example embodiments, able to read instructions from a machine-readable medium (e.g., a machine-readable storage medium) and perform any one or more of the methodologies discussed herein.

FIG. 7 is a block diagram illustrating components of a machine 700, according to some example embodiments, able to read instructions 604 from a machine-readable medium (e.g., a machine-readable storage medium) and perform any one or more of the methodologies discussed herein. Specifically, FIG. 7 shows a diagrammatic representation of the machine 700 in the example form of a computer system, within which instructions 710 (e.g., software, a program, an application, an applet, an app, or other executable code) for causing the machine 700 to perform any one or more of the methodologies discussed herein may be executed. As such, the instructions 710 may be used to implement modules or components described herein. The instructions 710 transform the general, non-programmed machine 700 into a particular machine 700 programmed to carry out the described and illustrated functions in the manner described. In alternative embodiments, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a PC, a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine 700 capable of executing the instructions 710, sequentially or otherwise, that specify actions to be taken by machine 700. Further, while only a single machine 700 is illustrated, the term "machine" shall also be taken to include a collection of machines that individually or jointly execute the instructions 710 to perform any one or more of the methodologies discussed herein.

The machine 700 may include processors 704, memory/storage 706, and I/O components 718, which may be configured to communicate with each other such as via a bus 702. The memory/storage 706 may include a memory 714, such as a main memory, or other memory storage, and a storage unit 716, both accessible to the processors 704 such as via the bus 702. The storage unit 716 and memory 714 store the instructions 710 embodying any one or more of the methodologies or functions described herein. The instructions 710 may also reside, completely or partially, within the memory 714, within the storage unit 716, within at least one of the processors 704 (e.g., within the processor's cache memory), or any suitable combination thereof, during execution thereof by the machine 700. Accordingly, the memory 714, the storage unit 716, and the memory of processors 704 are examples of machine-readable media.

The I/O components 718 may include a wide variety of components to receive input, provide output, produce output, transmit information, exchange information, capture measurements, and so on. The specific I/O components 718 that are included in a particular machine 700 will depend on the type of machine. For example, portable machines such as mobile phones will likely include a touch input device or other such input mechanisms, while a headless server machine will likely not include such a touch input device. It will be appreciated that the I/O components 718 may include many other components that are not shown in FIG. 7. The I/O components 718 are grouped according to functionality merely for simplifying the following discussion and the grouping is in no way limiting. In various example embodiments, the I/O components 718 may include output components 726 and input components 728. The output components 726 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 728 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 718 may include biometric components 730, motion components 734, environmental components 736, or position components 738 among a wide array of other components. For example, the biometric components 730 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 734 may include acceleration sensor components (e.g., accelerometer), gravitation sensor components, rotation sensor components (e.g., gyroscope), and so forth. The environmental components 736 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 738 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 718 may include communication components 740 operable to couple the machine 700 to a network 732 or devices 720 via coupling 724 and coupling 722, respectively. For example, the communication components 740 may include a network interface component or other suitable device to interface with the network 732. In further examples, communication components 740 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 720 may be another machine or any of a wide variety of peripheral devices (e.g., a peripheral device coupled via a USB).

Moreover, the communication components 740 may detect identifiers or include components operable to detect identifiers. For example, the communication components 740 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 740 such as location via Internet Protocol (IP) geo-location, location via Wi-Fi® signal triangulation, location via detecting a NFC beacon signal that may indicate a particular location, and so forth.

GLOSSARY

"CARRIER SIGNAL" in this context refers to any intangible medium that is capable of storing, encoding, or carrying instructions 710 for execution by the machine 700, and includes digital or analog communications signals or other intangible medium to facilitate communication of such instructions 710. Instructions 710 may be transmitted or received over the network 732 using a transmission medium via a network interface device and using any one of a number of well-known transfer protocols.

"CLIENT DEVICE" in this context refers to any machine 700 that interfaces to a communications network 732 to obtain resources from one or more server systems or other client devices. A client device may be, but is not limited to, mobile phones, desktop computers, laptops, PDAs, smart phones, tablets, ultra books, netbooks, laptops, multi-processor systems, microprocessor-based or programmable consumer electronics, game consoles, STBs, or any other communication device that a user may use to access a network 732.

"COMMUNICATIONS NETWORK" in this context refers to one or more portions of a network 732 that may be an ad hoc network, an intranet, an extranet, a virtual private network (VPN), a LAN, a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network 732 or a portion of a network 732 may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"MACHINE-READABLE MEDIUM" in this context refers to a component, device or other tangible media able to store instructions 710 and data temporarily or permanently and may include, but is not be limited to, random-access memory (RAM), read-only memory (ROM), buffer memory, flash memory, optical media, magnetic media, cache memory, other types of storage (e.g., erasable programmable read-only memory (EEPROM)), and/or any suitable combination thereof. The term "machine-readable medium" should be taken to include a single medium or multiple media (e.g., a centralized or distributed database, or associated caches and servers) able to store instructions 710. The term "machine-readable medium" shall also be taken to include any medium, or combination of multiple media, that is capable of storing instructions 710 (e.g., code) for execution by a machine 700, such that the instructions 710, when executed by one or more computer processors 704 of the machine 700, cause the machine 700 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors 704) may be configured by software (e.g., an application 616 or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor 704 or other programmable processor 704. Once configured by such software, hardware components become specific machines 700 (or specific components of a machine 700) uniquely tailored to perform the configured functions and are no longer general-purpose processors 704. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor 704 configured by software to become a special-purpose processor, the general-purpose processor 704 may be configured as respectively different special-purpose processors (e.g., comprising different hardware components) at different times. Software accordingly configures a particular processor or processors 704, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses 702) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more computer processors 704 that are temporarily configured (e.g., by software) or permanently configured to perform the relevant operations. Whether temporarily or permanently configured, such processors 704 may constitute processor-implemented components that operate to perform one or more operations or functions described herein. As used herein, "processor-implemented component" refers to a hardware component implemented using one or more computer processors 704. Similarly, the methods described herein may be at least partially processor-implemented, with a particular processor or processors 704 being an example of hardware. For example, at least some of the operations of a method may be performed by one or more computer processors 704 or processor-implemented components. Moreover, the one or more computer processors 704 may also operate to support performance of the relevant operations in a "cloud computing" environment or as a "software as a service" (SaaS). For example, at least some of the operations may be performed by a group of computers (as examples of machines 700 including processors 704), with these operations being accessible via a network 732 (e.g., the Internet) and via one or more appropriate interfaces (e.g., an API). The performance of certain of the operations may be distributed among the processors 704, not only residing within a single machine 700, but deployed across a number of machines 700. In some example embodiments, the processors 704 or processor-implemented components may be located in a single geographic location (e.g., within a home environment, an office environment, or a server farm). In other example embodiments, the processors 704 or processor-implemented components may be distributed across a number of geographic locations.

"PROCESSOR" in this context refers to any circuit or virtual circuit (a physical circuit emulated by logic executing on an actual processor 704) that manipulates data values according to control signals (e.g., "commands," "op codes," "machine code," etc.) and which produces corresponding output signals that are applied to operate a machine 700. A processor 704 may be, for example, a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC) or any combination thereof. A processor 704 may further be a multi-core processor having two or more independent processors 704 (sometimes referred to as "cores") that may execute instructions 710 contemporaneously.

What is claimed is:

1. A method comprising:
   receiving an input to initiate a boot process on a client device;
   in response to receiving the input, accessing firmware from a primary memory of the client device, the firmware including a set of instructions for initiating one or more of an operating system and an early boot image;
   causing display of a presentation of the early boot image on a display of the client device and executing the set of instructions to initiate the boot process, the presentation of the early boot image based on a status of the boot process;
   accessing a user profile associated with the client device, the user profile comprising user profile data that includes a set of user customization that identify one or more attributes;
   generating an avatar based on the one or more attributes defined by the set of user customization from the user profile data and the status of the boot process;
   in response to satisfaction of a progress trigger of the boot process, causing display of a main boot animation in place of the early boot image, the main boot animation including the avatar; and
   causing display of a start screen in place of the main boot animation upon completion of the boot process.

2. The method of claim 1, wherein the early boot image is a static image and the main boot animation is an animation.

3. The method of claim 1, further comprising:
   in response to satisfaction of a second progress trigger, modifying presentation of the main boot animation.

4. The method of claim 1, wherein the primary memory is a Read-Only Memory (ROM) accessible by a computer processing unit (CPU) of the client device.

5. The method of claim 4, wherein the main boot animation is accessed from a secondary memory.

6. The method of claim 1, wherein the causing presentation of the main boot animation further comprises:
- selecting a theme based on data accessed at the client device; and
- generating the main boot animation based on the theme.

7. The method of claim 6, wherein the data includes location data, and the theme corresponds with a location identified by the location data.

8. A client device comprising:
- one or more computer processors; and
- one or more computer readable mediums storing instructions that, when executed by the one or more computer processors, causes the client device to perform operations comprising:
- receiving an input to initiate a boot process on a client device;
- in response to receiving the input, accessing firmware from a primary memory of the client device, the firmware including a set of instructions for initiating one or more of an operating system and an early boot image;
- causing display of a presentation of the early boot image on a display of the client device and executing the set of instructions to initiate the boot process, the presentation of the early boot image based on a status of the boot process;
- accessing a user profile associated with the client device, the user profile comprising user profile data that includes a set of user customization that identify one or more attributes;
- generating an avatar based on the one or more attributes defined by the set of user customization from the user profile data and the status of the boot process;
- in response to satisfaction of a progress trigger of the boot process, causing display of a main boot animation in place of the early boot image, the main boot animation including the avatar; and
- causing display of a start screen in place of the main boot animation upon completion of the boot process.

9. The client device of claim 8, wherein the early boot image is a static image and the main boot animation is an animation.

10. The client device of claim 8, the operations further comprising:
- in response to satisfaction of a second progress trigger, modifying presentation of the main boot animation.

11. The client device of claim 8, wherein the primary memory is a Read-Only Memory (ROM) accessible by a computer processing unit (CPU) of the client device.

12. The client device of claim 11, wherein the main boot animation is accessed from a secondary memory.

13. The client device of claim 8, wherein the causing presentation of the main boot animation further comprises:
- selecting a theme based on data accessed at the client device; and
- generating the main boot animation based on the theme.

14. The client device of claim 13, wherein the data includes location data, and the theme corresponds with a location identified by the location data.

15. A non-transitory machine-readable storage medium comprising instructions that, when executed by one or more processors of a client device, cause the client device to perform operations comprising:
- receiving an input to initiate a boot process on a client device;
- in response to receiving the input, accessing firmware from a primary memory of the client device, the firmware including a set of instructions for initiating one or more of an operating system and an early boot image;
- causing display of a presentation of the early boot image on a display of the client device and executing the set of instructions to initiate the boot process, the presentation of the early boot image based on a status of the boot process;
- accessing a user profile associated with the client device, the user profile comprising user profile data that includes a set of user customization that identify one or more attributes;
- generating an avatar based on the one or more attributes defined by the set of user customization from the user profile data and the status of the boot process;
- in response to satisfaction of a progress trigger of the boot process, causing display of a main boot animation in place of the early boot image, the main boot animation including the avatar; and
- causing display of a start screen in place of the main boot animation upon completion of the boot process.

16. The non-transitory machine-readable storage medium of claim 15, wherein the early boot image is a static image and the main boot animation is an animation.

* * * * *